United States Patent [19]

Singh et al.

[11] Patent Number: 4,894,297
[45] Date of Patent: Jan. 16, 1990

[54] ELECTROCHEMICAL GENERATOR APPARATUS CONTAINING MODIFIED FUEL ELECTRODES FOR USE WITH HYDROCARBON FUELS

[75] Inventors: Prabhakar Singh, Pittsburgh; Roswell J. Ruka, Chruchill; Raymond A. George, Pittsburgh, all of Pa.

[73] Assignee: Westinghouse Electric Corp., Pittsburgh, Pa.

[21] Appl. No.: 280,908

[22] Filed: Dec. 7, 1988

[51] Int. Cl.⁴ .............................................. H01M 8/10
[52] U.S. Cl. ......................................... 429/31; 429/40
[58] Field of Search ....................... 429/30, 31, 33, 40

[56] References Cited

U.S. PATENT DOCUMENTS

| | | | |
|---|---|---|---|
| 3,684,578 | 8/1972 | Makishima et al. | 429/40 |
| 4,374,184 | 2/1983 | Somers et al. | 429/17 |
| 4,451,578 | 5/1984 | Setzer et al. | 502/303 |
| 4,490,444 | 12/1984 | Isenberg | 429/31 |
| 4,582,766 | 4/1986 | Isenberg et al. | 429/30 |
| 4,640,875 | 2/1987 | Makiel | 429/30 |
| 4,664,987 | 5/1987 | Isenberg | 429/31 |
| 4,702,971 | 10/1987 | Isenberg | 429/31 |
| 4,728,584 | 3/1988 | Isenberg | 429/31 |

Primary Examiner—Donald L. Walton
Attorney, Agent, or Firm—Daniel P. Cillo

[57] ABSTRACT

An electrochemical generator apparatus (30) is constructed containing one or more electrochemical cells (10), the cells containing a porous fuel electrode (18), a porous air electrode (14), and solid oxide electrolyte (16) disposed therebetween, where the fuel electrode is impregnated with chemicals which form metal oxides upon heating, where the metal of the oxide is selected from the group consisting of Mg, Ca plus Al, Sr plus Al, Zr, Y, Ce, and their mixtures; and where these electrochemical cells are contacted with a hydrocarbon fuel gas and operated at over 800° C., and where the metal oxides are effective in preventing cell deterioration due to carbon deposition from the hydrocarbon fuel.

15 Claims, 5 Drawing Sheets

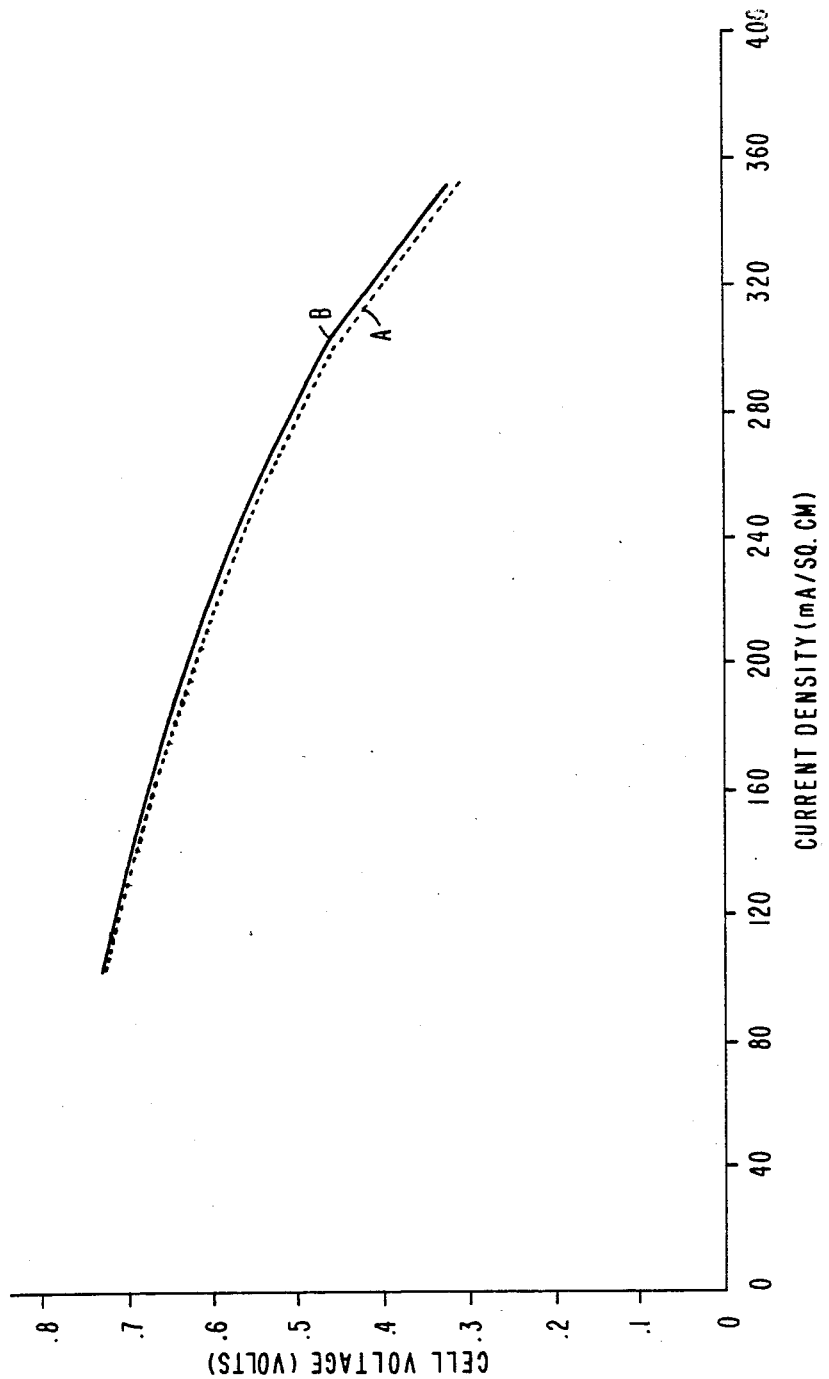

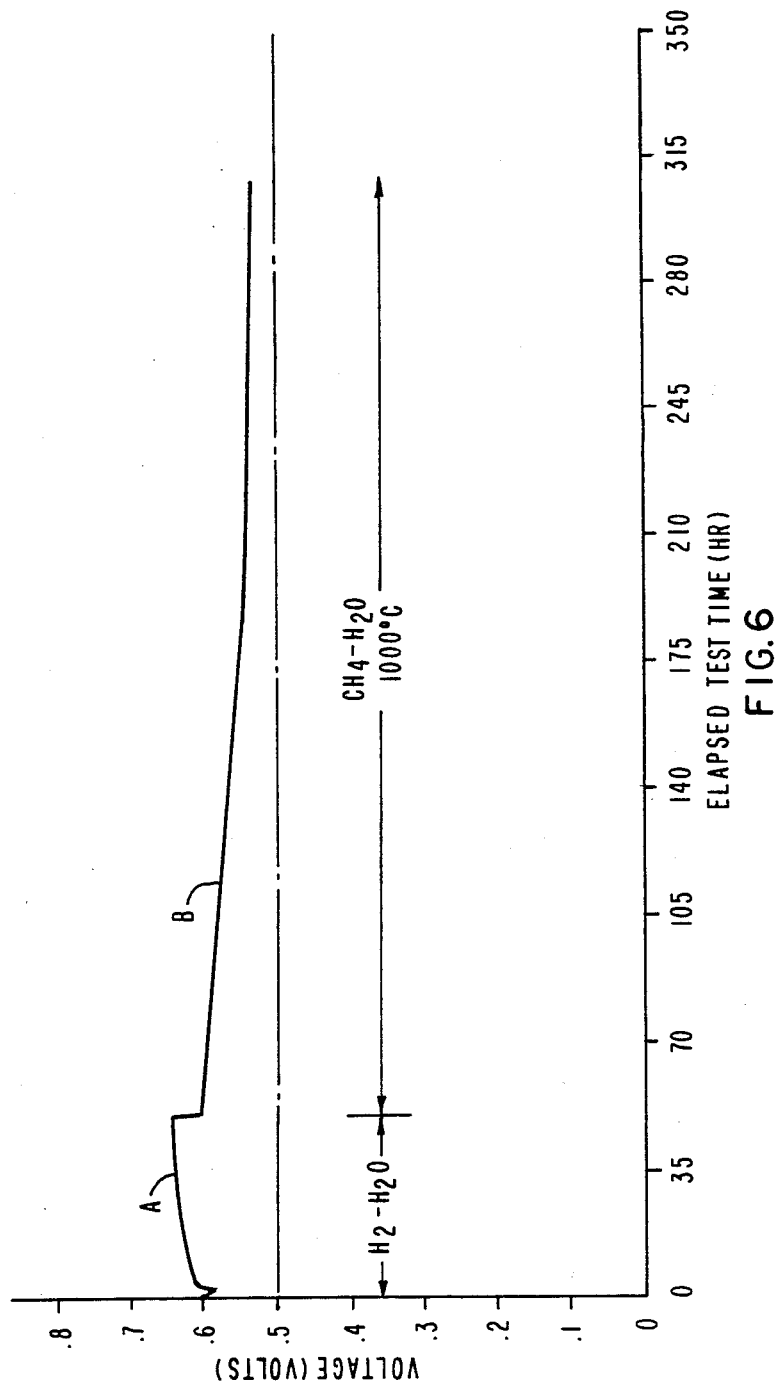

ELECTROCHEMICAL GENERATOR APPARATUS CONTAINING MODIFIED FUEL ELECTRODES FOR USE WITH HYDROCARBON FUELS

BACKGROUND OF THE INVENTION

1. Field of the Invention

The present invention relates to an electrochemical generator apparatus containing solid oxide electrochemical cells containing fuel electrodes operating in a hydrocarbon fuel environment, where the fuel electrodes are impregnated with selected chemicals to form metal oxides upon heating. The metal oxides prevent cell degradation which was caused by carbon formation.

2. Description of the Prior Art

High temperature solid oxide fuel cells convert chemical energy into electrical energy, typically at temperatures of from about 800° C. to 1,200° C. Such solid oxide fuel cells, solid oxide fuel cell configurations, and solid oxide fuel cell generators are well known, and taught, for example, by Isenberg in U.S. Pat. Nos. 4,490,444 and 4,664,987, Makiel in U.S. Pat. No. 4,640,875, and Somers et al., in U.S. Pat. No. 4,374,184. In all of these patents, an axially elongated, tubular air cathode, usually made of a doped oxide of the perovskite family, has solid oxide electrolyte deposited over it, except for a small radial segment which contains a deposit of interconnection material down the length of the tube. A fuel anode, usually a nickel-zirconia cermet, forms an outer layer over the electrolyte, to provide a fuel cell. A metal fiber, current collector felt is then attached to the interconnection. Other fuel cell configurations are also known, such as those taught by Isenberg, in U.S. Pat. No. 4,728,584.

Typical fuel electrode construction for tubular solid oxide fuel cells is taught by Isenberg et al. in U.S. Pat. No. 4,582,766 and Isenberg, in U.S. Pat. No. 4,702,971, the latter of which contains a ceria or urania ionic-electronic conductive coating to increase sulfur tolerance of the electrode. In all of these applications, the cells and cell assemblies can be electrically connected in series and parallel, hydrocarbons or other fuel can be fed to contact the fuel electrode on the exterior surface of the fuel cell and air or oxygen can be fed to contact the central, interior air electrode. Insulation used with all of these cell designs is usually low density alumina.

Utilization of both methane, and natural gas containing higher hydrocarbons as fuels is possible in the axially elongated interconnection designed cells. However, there is a possibility of some performance degradation and electrical shorting between the fuel electrode and the interconnection due to carbon deposition, especially when higher hydrocarbons are used in the fuel. Also, in some instances, during cell operation, fuel electrodes are prone to deactivation for the reformation of methane and other hydrocarbon fuels along at least part of the cell length.

Carbon deposition on the fuel electrode surface is thought to result from poor water adsorption on the fuel electrode, leading to slower gasification of carbon from adsorbed hydrocarbons at the surface. If $H_2O$ is not adsorbed, the adsorbed oxygen species necessary to react with adsorbed carbon species, to form $CO$ and $CO_2$ gases, will not be present in sufficient quantity, and will result in formation of carbon which is encapsulating in nature and remains resistant to oxidation, even though $H_2O$ is present in the fuel atmosphere.

Removal of such carbon, once formed at electrode surfaces, is usually very difficult. Formation of a continuous layer of carbon between the fuel electrode and the interconnection may also, in some circumstances, after prolonged use, result in the development of an electrical short circuit path and cause performance decay of the cell. Formation of a surface layer of carbon on the fuel electrode prevents fuel species from reaching the electrochemical reaction zone at the electrolyte interface, thus degrading fuel cell performance.

In the area of catalytic reforming of heavy gaseous and/or liquid hydrocarbons containing sulfur, utilizing the injection of steam to produce hydrogen, but not involving fuel cells, Setzer et al., in U.S. Pat. No. 4,451,578, teaches high activity iron oxide catalysts which demonstrate a better resistance to carbon plugging than nickel catalysts. The catalyst can be unsupported and contain 90% $FeO$ or $Fe_2O_3$ plus modifiers such as $Al_2O_3$, $K_2O$, $CaO$ or $SiO_2$, or the catalyst can be unmodified, and supported on $Al_2O_3$, $CaO$ impregnated $Al_2O_3$ and La stabilized $Al_2O_3$. In a typical example, 0.318 cm (0.125 inch) diameter $Al_2O_3$ pellets were impregnated with $Ca(NO_3)_2$, placed in an ultrasonic blender, dried, and then calcined at 1010° C. This material was then impregnated with $Fe(NO_3)_3.9H_2O$, dried, and then calcined at 1000° C.

What is needed, for fuel cells using a hydrocarbon fuel, is a means to prevent carbon formation on the anode electrode exposed electrolyte, and metal fiber current collector felts, in a fuel cell or cell bundle operating at 800° C. to 1200° C. with a hydrocarbon fuel feed. The main object of this invention is to provide such a means.

SUMMARY OF THE INVENTION

Accordingly, the present invention resides, generally, in an electrochemical generator apparatus containing an electrochemical cell assembly comprising at least one electrochemical cell containing a fuel electrode, where a fuel containing hydrocarbons contacts the fuel electrode, characterized in that said fuel electrode is impregnated with chemicals which form metal oxides upon heating, where the metal of the oxide is selected from the group consisting of Mg, Ca plus Al, Sr plus Al, Zr, Y, Ce, and mixtures thereof, with Mg preferred. The term "impregnated" as used herein means distributed throughout the bulk of the fuel electrode. These oxides are preferably formed by heating appropriate metal salts, which would include, preferably, nitrates, formates, acetates, propionates and butyrates.

The electrochemical cell can be a fuel cell, which preferably contains an attached nickel fiber current collector felt on the fuel electrode, where the fuel electrode and current collector felt are impregnated with the metal oxide. It has been found that the metal oxides described previously are effective in adsorbing $H_2O$, which can provide the oxygen required to combine with any carbon from adsorbed fuel species, allowing continued high hydrocarbon feed reforming activity at the fuel electrode, with minimal hydrocarbon cracking or hydrocarbon decomposition to form carbon. The metal salts used to form the metal oxides and the metal oxides described have been found to not form compositions harmful to the fuel cells at 1,000° C. in the presence of hydrocarbon fuel.

The preferred method of applying the metal salt is as a solution in water or an organic solvent, by vacuum impregnation, and the preferred fuel electrode is a stabilized nickel-zirconia cermet i.e. nickel particles held in a stabilized zirconia skeletal structure. Preferably, the porous fuel electrode is uniformly impregnated, so that minute metal oxides are formed throughout, including the area near the electrochemical zone deep within the fuel electrode at the interface between the fuel electrode and the electrolyte. These oxides are effective in preventing cell deterioration due to carbon deposition from the fuel gas feed.

BRIEF DESCRIPTION OF THE DRAWINGS

The invention will become more readily apparent from the following description thereof, shown by way of example only, in the accompanying drawings in which:

FIG. 5 is a voltage vs. current density curve, for a fuel cell having a modified fuel electrode containing metal oxides according to this invention, utilizing methane, curve A, and synthetic gas, curve B; and FIG. 6 is a voltage vs. time, fuel cell performance curve, for standard, unmodified fuel electrode fuel cells.

DESCRIPTION OF THE PREFERRED EMBODIMENTS

Figure 1:
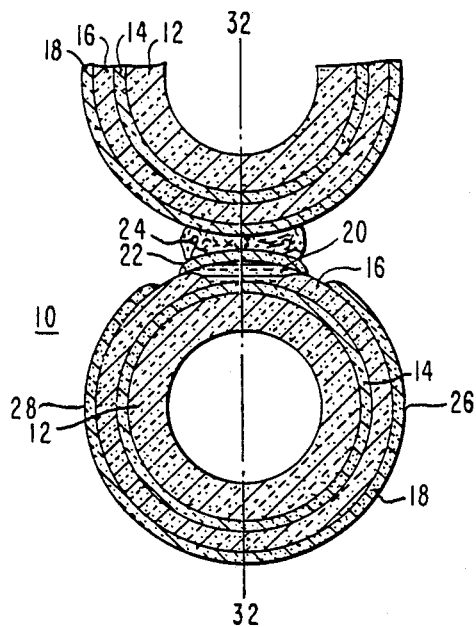
FIG. 1 is a cross-sectional view of two tubular fuel cells connected in series through a metal fiber current collector felt, where the exterior fuel electrode and the felt contain impregnated metal oxide particles in accordance with this invention.

Referring now to FIG. 1 of the Drawings, a preferred configuration for solid oxide fuel cells 10 is shown. The preferred configuration is based upon a system wherein a gaseous fuel, such as methane or higher hydrocarbon is directed axially over the outside of the cell to contact a fuel electrode 18, and an oxidant, such as air or $O_2$ flows through the inside of the cell to contact an air electrode 14. The term "air electrode" as used throughout means that electrode which will be in contact with oxidant, and "fuel" electrode means that electrode that will be in contact with fuel.

In a preferred form, each cell 10 may include a porous support tube 12. In some instances, the air electrode 14 can be self supporting. In an exemplary cell, the support tube 12 can be made of calcia stabilized zirconia, forming a porous wall approximately one to two millimeters thick. Surrounding the outer periphery of the support tube 12 is a porous air electrode, or cathode 14. The exemplary system cathode is a composite oxide structure approximately 0.05 millimeter to 1.5 millimeter thick, which is deposited onto the support tube through well-known techniques. The cathode (air electrode) is, for example, comprised of doped and undoped oxides or mixtures of oxides, such as $LaMnO_3$, $CaMnO_3$, $LaNiO_3$, $LaCoO_3$, $LaCrO_3$, doped indium oxide, $In_2O_3$, various noble metals, and other electronically or mixed conducting mixed oxides generally composed of rare earth oxides chemically combined with oxides of cobalt, nickel, copper, iron, chromium and manganese, and combinations of such oxides. The preferred cathode is doped $LaMnO_3$. Preferred dopants are strontium, calcium, cobalt, nickel, iron, and tin.

Generally surrounding the outer periphery of the air electrode is a layer of gas-tight solid electrolyte, generally comprised of yttria stabilized zirconia, about 1 micrometer to 100 micrometers thick. The electrolyte can be deposited by well known high temperature vapor deposition techniques. However, a selected radial segment is, for example, masked during electrolyte deposition, and a layer of an interconnect material is deposited on this segment.

The interconnect material 20, which preferably extends over the active length of each elongated cell 10 must be electrically conductive in both oxidant and fuel environment. Accordingly, the exemplary cell includes a gas-tight interconnection approximately the same thickness as the electrolyte, 5 micrometers to 100 mcirometers. The preferred interconnection material is lanthanum chromite doped with calcium, strontium or magnesium.

Substantially surrounding the solid electrolyte 16 is a second porous electrode, for example, a nickel-zirconia or cobalt zirconia cermet fuel electrode, as anode 18. As shown, the anode is also discontinuous, being spaced from the interconnection 20 a distance sufficient to avoid direct electrical communication between the anode 18 and the interconnection 20 and the cathode 14. The exemplary anode 18 is about 100 micrometers thick. The fuel electrode is made of nickel or cobalt particles imbedded in a surrounding oxide skeleton. This skeleton is preferably the same composition as the electrolyte, $ZrO_2$ doped with $Y_2O_3$. The fuel electrode as a whole is porous.

Deposited over the interconnection 20 is a layer 22 which is preferably comprised of nickel, of the same thickness as the fuel anode, about 100 micrometers. FIG. 1. also shows the series interconnection between consecutive fuel cells 10. The electrical interconnection is preferably enhanced by a porous metal felt 24 made, for example, of nickel fibers. The felt extends axially between the annular cells 10, and is bonded to each by pressure contact which causes sinter bonding during operation.

During operation, air, or $O_2$ flows through the center of the annular cells 10, and fuel passes over the exterior. Oxygen molecules diffuse through the porous support and cathode. Fuel diffuses through the anode. Oxygen ions pass through the electrolyte. These reactants electrochemically interact near the electrolyte/anode interface, via the actions of the electrolyte and electrodes in generating products such as water vapor and carbon dioxide, as well as heat and electrical energy. Water vapor and carbon dioxide formed at higher temperature on the anode are carried away from the cell with, for example, unburned fuel, and electrical current is transferred in series from the inner cathode 14 of one cell to the outer anode 18 of the next cell. The electrical current is usefully drawn through leads not shown. Additional metal fiber current collector felts may be attached as at points 26 and 28 to provide parallel connections to additional side by side cells of a fuel cell bundle, best shown in FIG. 2.

Figure 2:
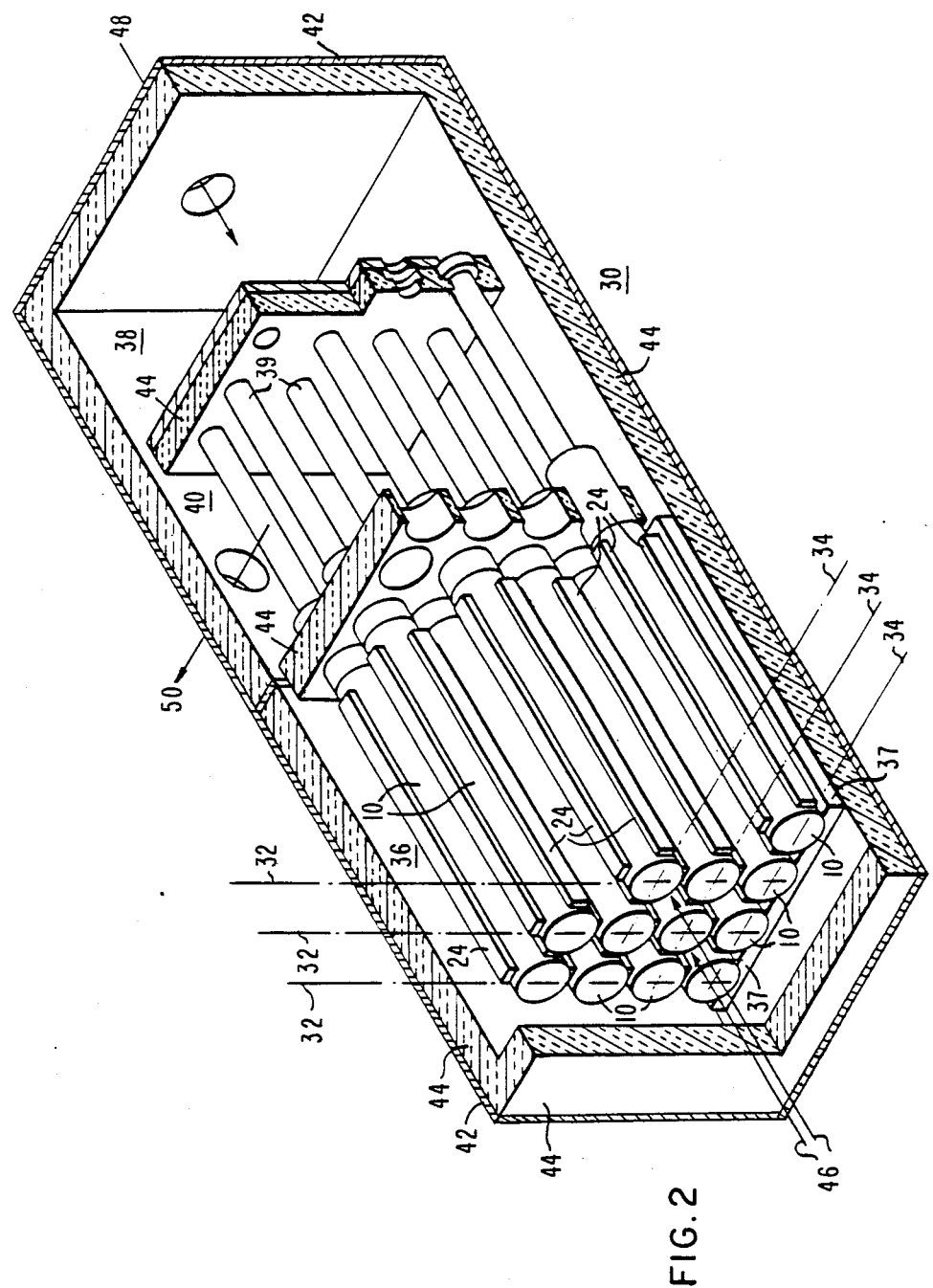
FIG. 2, which best illustrates the invention, is a broken perspective view of one embodiment of a fuel cell bundle surrounded by insulation in the generating chamber of a fuel cell electrochemical power generator.

A fuel cell bundle is shown as a plurality of felt connected cells 10 in FIG. 2, assembled in one embodiment of an electrochemical power generator apparatus, shown as 30. As can be seen, the plurality of fuel cells 10 are connected in series through felts 24 along the vertical rows 32, and in parallel along the horizontal rows 34, in electrical energy generating chamber 36. Final connection is made to conductive metal plate or bus bar 37. The generator apparatus 30 can include an oxidant gas inlet chamber 38, and a combustion product or preheating chamber 40, all within an exterior metal housing 42. Insulation 44, usually pressed alumina $Al_2O_3$ felt, is shown throughout the generator 30. Fuel, shown as arrows 46, can enter generating chamber 36 through an opening or manifold system, not shown, and flow around the fuel cells. Oxidant shown as arrow 48 can enter the inlet chamber 38 as shown, and flow into the center of the fuel cells through oxidant feed tubes 39. Combusted exhaust gas, shown as arrow 50 can exit the preheating chamber as shown or can exit countercurrent to the oxidant 48 by an effective manifolding system, not shown.

The plurality of assembled cells, a cell bundle, shown in FIG. 2, or individual cells, shown best in FIG. 1, with or without attached current collector felts, can be modified by: first, impregnating the fuel electrode with a selected chemical, such as a metal salt solution capable of forming a metal oxide upon heating, into the fuel electrode of an individual electrochemical cell, with or without an attached metal current collector felt, or into a bundle of a plurality of electrochemical cells connected in series and preferably also in parallel. These electrochemical cells must have an air electrode, a nickel or cobalt containing fuel electrode, and solid oxide electrolyte therebetween. The configuration of the electrochemical cells can be round, oval, flattened, triangular, and the like. The cells can be of single elongated construction, a plurality of separate cell segments on a cell assembly, or a monolithic corrugated construction.

Figure 3:
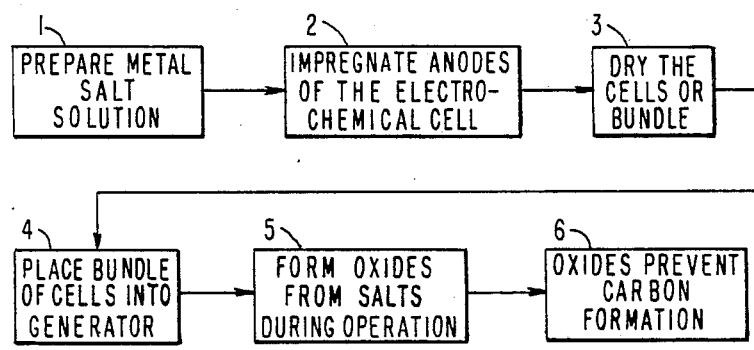
FIG. 3 is a block diagram showing the method of impregnating the fuel electrode with selected chemicals and the formation of metal oxides as discussed in this invention.

The metal salt solution, aqueous or organic is preferably selected from the group consisting of nitrates, formates, acetates, propionates, and butrates, Step 1 of FIG. 3. Phosphates and particularly sulfates can harm the electrochemical cell activity and are excluded. The metal is selected from the group consisting of Mg, Ca+Al, Sr+Al, Zr, Y, Ce, and mixtures thereof, with Mg, Ca+Al, and Sr+Al preferred, and Mg most preferred. The preferred impregnant is an aqueous solution of magnesium acetate $Mg(OOCCH_3)_2$ or $Mg(OOCCH_3)_2 \cdot 4H_2O$ or magnesium nitrate, $Mg(NO_3)_2 \cdot 2H_2O$.

When the fuel stream contains higher hydrocarbons, such as $C_2H_6$, $C_3H_8$, etc., substantial internal reforming capability of the anode can be desirable, and metal salts which will provide oxides that are readily capable of adsorbing $H_2O$ are desirable. In this instance Mg salts are much preferred, as they provide MgO, which is a strong $H_2O$ adsorber, which adsorbed $H_2O$ can supply oxygen to react with adsorbed carbon released from hydrocarbon cracking, to form CO and $CO_2$ which are released into the fuel stream.

Optionally, from 0.5 wt. % to 6 wt. %, preferably 1 wt. % to 3 wt. %, based on metal salt weight, of a nonionic surface-active agent, i.e., nonionic surfactant, which reduces interfacial tension between the metal salt solution and the nickel and stabilized zirconia of the fuel electrode can be used when the metal salt is impregnated. These types of materials are well known in the art and can include alkylaryl ether alcohols, alkylaryl polyether alcohols, alkylaryl polyethylene glycol ethers, and the like. The surfactant is generally eliminated by vaporization or oxidation before the 1,000° C. operating temperature of the generator is reached. These materials help in impregnation of the finer pores of the anode. Before impregnating the electrochemical cell containing the fuel electrode, the metal salt solution is de-aerated to remove trapped air, by a process such as boiling for a short period.

Preferably, the metal salt solution is applied by vacuum impregnation techniques, where the electrochemical cell is placed in a container and a vacuum is drawn. Then, the de-aerated metal salt solution is added to the container until the fuel electrode is covered. This procedure insures that no air will be trapped in the fuel electrode pores, thus promoting complete penetration of metal salt solution through the bulk of the fuel electrode to the interface of the electrolyte, Step 2 of FIG. 3. Alternative but less preferred application techniques are pressurized spraying and dipping.

After impregnation into the porous fuel electrode or nickel metal felt, the metal salts are allowed to dry, preferably at approximately 25° C., Step 3 of FIG. 3. The metal salt penetrates deeply into the pores of the fuel electrode between the nickel particles and the zirconia skeleton, where the fuel electrode is about 30% to 40% porous, and any attached current collectors, which are about 85% to 97% porous. This provides the impregnated electrochemical cell described in this invention.

Single electrochemical cells, impregnated in this fashion can then be made into a bundle. Preferably, the bundle itself, such as that shown in FIG. 2, containing a plurality of electrically connected cells 10, including possibly also the bus bars 37, is impregnated as one unit. Then, as Step 4 in FIG. 3, the bundle, or other configuration of cells as described previously, is placed into an electrochemical generator such as that shown as 30 in FIG. 2.

Preheated hydrocarbon containing fuel is fed into the generator to reach start up temperature and then oxidant, such as air is also fed into the generator. At between about 400° C. and 1,000° C., the applied salts, in the fuel cell assembly in the generator, will form oxides, for example MgO, $CaO \cdot Al_2O_3$, $SrO \cdot Al_2O_3$, $ArO_2$, $Y_2O_3$, $CeO_2$ or the like, Step 5 of FIG. 3. These oxides are formed as minute particles approximately 0.01 micrometer to 1 micrometer (0.01 micron to 1 micron) in diameter, much smaller than the nickel particles of the fuel electrode, which are usually from 3 micrometers to 15 micrometers in diameter. All these oxides are insulative in the generator environment except $CeO_2$ which is mildly conductive. Therefore, if $CeO_2$ is formed, it should be removed from the exposed non-poorous electrolyte portion between the interconnection and the fuel electrode. During the impregnation stage this can be done by wiping off the impregnating solution from the exposed electrolyte area.

These oxides are distributed through the bulk of the fuel electrode, and as described previously, attract and adsorb $H_2O$, which $H_2O$ aids the process of hydrocarbon feed reforming at the fuel electrode. This results in the ready formation of $H_2$, $CO_2$, and $CO_2$ rather than the potential competing steps involved in cracking or hydrocarbon decomposition to form carbon, Step 6 of FIG. 3.

The invention will now be illustrated by reference to the following non-limiting Example.

EXAMPLE

Two axially elongated, solid oxide fuel cells, similar to those shown in FIG. 1 of the Drawings, were made. They each had a calcia stabilized zirconia support tube, a lanthanum manganite interior air electrode, a yttria stabilized zirconia electrolyte, and a nickel-stabilized zirconia cermet fuel electrode, where a yttria stabilized zirconia skeleton was grown around 5 micrometer nickel particles by a vapor deposition process well known in the art. They each included a magnesium doped lanthanum chromite interconnection. Both cells tested favorably for leak tightness. They were both about 40 cm long, with a 36 cm long active length, and a 1.5 cm outside diameter.

One fuel cell, Sample A, was placed in a horizontally fixed, long, tubular, closed end vessel having an end closure and a plurality of rubber septum side closures. A vacuum was drawn on the fuel cell. Then, a degassed aqueous solution of research grade magnesium acetate solution (0.43 g. magnesium acetate in 1 g. of distilled water) containing about 0.043 g. (3 wt. %) of nonionic surfactant was placed in a hypodermic needle. The metal salt solution was squirted onto a plurality of portions of the fuel cell by inserting the hypodermic through the rubber septums. The cell was left in the chamber for about 3 hours for soaking and uniform distribution of the metal salt solution. Impregnation into the bulk of the electrode by capillary action on the metal salt was visually apparent. The cell was later dried at 25° C. for 24 hours.

A porous nickel fiber metal current collector was then attached to the interconnection and fuel electrode of both Sample A and B cells, as was a nickel busbar. Then, the Sample A assembly was again vacuum impregnated with the aqueous magnesium acetate solution so that the attached nickel felt was also impregnated. The cell was dried again at room temperature and installed in a cell test envelope made of alumina lined quartz for electrochemical evaluation. The unimpregnated, Sample B, cell was also placed in a similar cell test envelope for electrochemical evaluation.

In both instances, the cell temperature was slowly raised to 600° C. over 16 hours duration, in a 90% $N_2$-5% $H_2$-5% $H_2O$ atmosphere, at which time magnesium oxides were formed in the impregnated Sample A cell. The cells were subsequently brought up to and through 800° C. The cells were then operated at 1,000° C. in 95% $H_2$-5% $H_2O$, to obtain stable cell voltage. Fuel was then changed to methane (high purity Matheson grade 99.99% pure $CH_4$) plus $H_2O$ vapor, in the volume ratio 3/1 of $H_2O/CH_4$, at 75 hours for Sample A, and at 55 hours for unimpregnated Sample B. The cell voltage was then monitored with time. Cell open circuit voltage, cell resistance and gas composition along cell length was also monitored from time to time.

Figure 4:
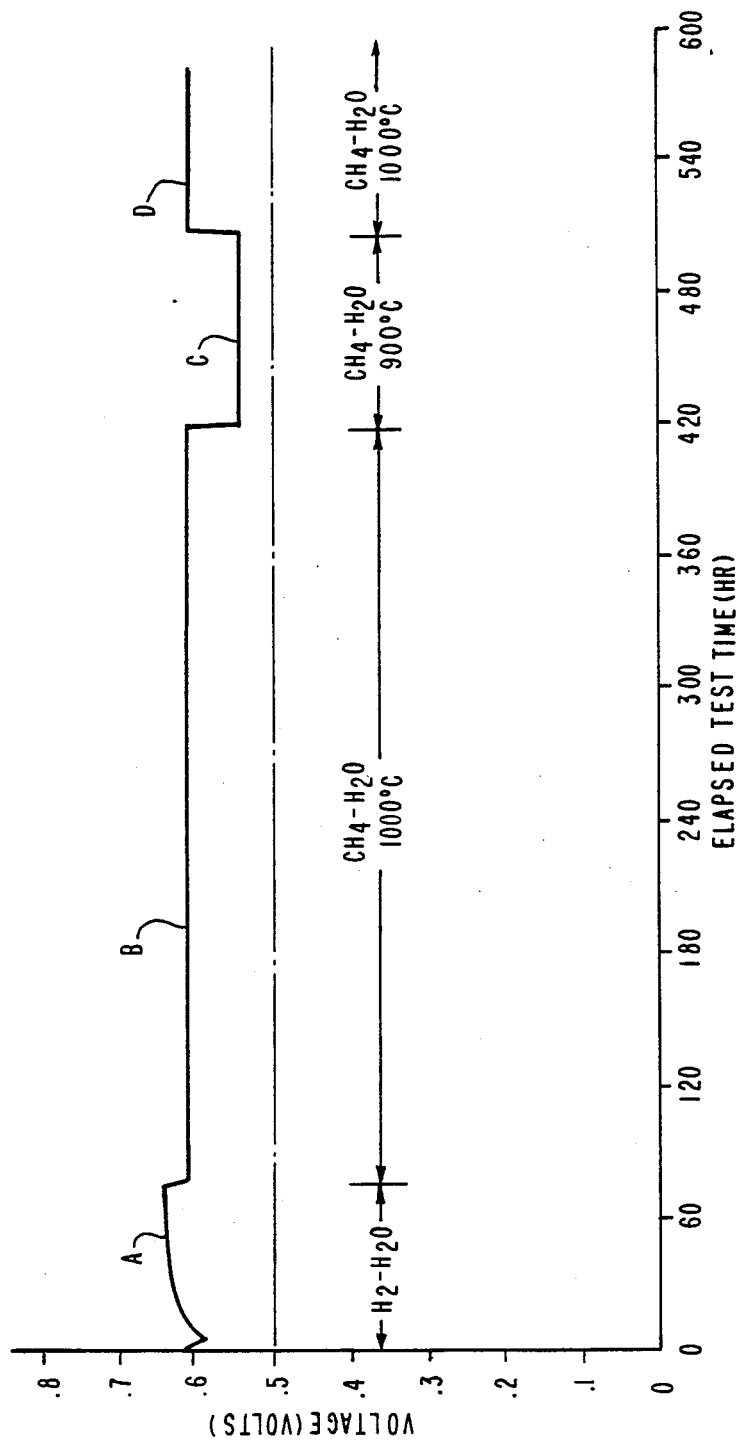
FIG. 4 is a voltage vs. time, fuel cell performance curve, for a fuel cell having a fuel electrode impregnated with chemicals which form metal oxides according to this invention.

The voltage vs. time curve for the Sample A fuel cell, the cell of this invention, is shown in FIG. 4 of the Drawings. Initial voltage with $H_2$ feed is shown as curve portion A. The voltage remained stable, shown as curve portion B, until the temperature was dropped to 900° C. at about 420 hours, for which process a voltage drop occurred as shown as curve portion C, but, very impressively, when the temperature was brought back up to 1,000° C. at about 520 hours there was complete recovery of voltage, shown as curve portion D. The test was concluded at about 580 hours.

In later tests of similar fuel cells, no measurable deactivation of the fuel electrode was observed at up to 2,000 hours of operation. Test conditions were air as oxidant, 3/1 ratio of $H_2O/CH_4$ fuel feed, $CH_4$, 85% fuel utilization, 25% air utilization, and a current density of about 250 mA/cm$^2$. In a similar impregnated cell, identical cell voltage vs. current density curves were obtained, FIG. 5 of the Drawings, indicating that metal salt impregnation does not harm cell performance and that excellent performance is achieved in $H_2$ as well as in $CH_4 + H_2O$.

The voltage vs. time curve for the standard (comparative) Sample B fuel cell, the unimpregnated cell, is shown as FIG. 6 of the drawings. Initial voltage with $H_2$ feed is shown as A. Curve B shows introduction of methane and water vapor at about 40 hours, after which the voltage gradually dropped during continued operation, to 315 hours, clearly indicating deactivation. The test was concluded at about 320 hours. Test conditions were air oxidant, $CH_4$ and $H_2O$ fuel, 85% fuel utilization, 25% air utilization, and a current density of about 250 mA/cm$^2$.

Upon completion of both tests 580 hours operation for Sample A fuel cell, and 320 hours operation for unimpregnated comparative Sample B fuel cell, both fuel cells were examined through a scanning electron microscope with an attached electron diffraction x-ray analyzer. No carbon was observed on the Sample A fuel cell of this invention but carbon was observed in the Sample B fuel cell.

The Sample A cell, containing magnesium oxides was thus seen to be much superior in preventing carbon formation on the fuel electrode.

We claim:

1. An electrochemical generator apparatus (30), containing an electrochemical cell assembly comprising at least one electrochemical cell (10) containing a fuel electrode (18), where a fuel (46) containing hydrocarbons contacts the fuel electrode, the improvement characterized in that the fuel electrode is impregnated with chemicals which form metal oxides upon heating, where the metal of the oxide is selected from the group consisting of Mg, Ca plus Al, Sr plus Al, Zr, Y, Ce, and mixtures thereof.

2. The electrochemical generator apparatus of claim 1, where the electrochemical cell (10) comprises a porous fuel electrode (18) containing nickel, an air electrode (14), and a solid electrolyte (16) therebetween.

3. The electrochemical generator apparatus of claim 1, where the electrochemical cell is a fuel cell.

4. The electrochemical generator apparatus of claim 1, where the cell assembly comprises a plurality of cells electrically connected with porous, fiber metal current collectors, where the current collectors are also impregnated with the chemicals.

5. The electrochemical generator apparatus of claim 1, where the fuel electrode contacts a solid oxide electrolyte and the fuel electrode is impregnated with the chemicals to the electrolyte surface, where the fuel electrode comprises a porous nickel-zirconia cermet.

6. The electrochemical generator apparatus of claim 1, where the metal of the oxide is selected from the group consisting of Mg, Ca plus Al, and Sr plus Al.

7. The electrochemical generator apparatus of claim 1, where the metal of the oxide is Mg.

8. The electrochemical generator apparatus of claim 1, where the metal oxide is formed in the fuel electrode by heating metal salts where the salt is selected from the group consisting of nitrate, formate, acetate, propionate and, butyrate.

9. The electrochemical generator apparatus of claim 1, where the metal oxide is magnesium oxide, formed from heating a metal salt selected from the group consisting of Mg nitrate, Mg acetate, and mixtures thereof.

10. The electrochemical generator apparatus of claim 1, operating at a temperature over 800° C., where the metal oxides are effective in attracting any water present in the fuel, and the adsorbed water provides oxygen to combine with any carbon from decomposing hydrocarbon fuel.

11. The electrochemical generator apparatus of claim 1, where the electrochemical cell has a tubular, axially elongated configuration.

12. A fuel cell generator apparatus, containing a fuel cell assembly operating at a temperature over 800° C. and comprising at least one fuel cell containing a fuel electrode, an air electrode and solid electrolyte therebetween, where a fuel containing hydrocarbons contacts the fuel electrode and where the fuel electrode contains metal oxide, where the metal is selected from the group consisting of Mg, Ca plus Al, Sr plus Al, and mixtures thereof, where the metal oxides formed are effective in attracting any water present in the fuel, and the adsorbed water can provide oxygen to combine with any carbon from decomposing hydrocarbon fuel.

13. The fuel cell generator apparatus of claim 12, where the fuel cell assembly comprises a plurality of fuel cells electrically connected with porous, fiber metal current collectors, where the current collectors also contain metal oxide.

14. The fuel cell generator apparatus of claim 12, where the metal oxide is distributed through the bulk of the fuel electrode to the electrolyte surface.

15. The fuel cell generator apparatus of claim 12, where the metal oxide is magnesium oxide.

* * * * *